United States Patent
Dong et al.

(10) Patent No.: US 12,287,735 B2
(45) Date of Patent: Apr. 29, 2025

(54) METHOD, DEVICE, AND COMPUTER PROGRAM PRODUCT FOR STORING DATA BASED ON MULTIPLE CACHE HIT RATIOS AND ASSOCIATED PREDICTION HIT RATIOS

(71) Applicant: Dell Products L.P., Round Rock, TX (US)

(72) Inventors: Hailan Dong, Chengdu (CN); Chi Chen, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 18/336,179

(22) Filed: Jun. 16, 2023

(65) Prior Publication Data

US 2024/0394184 A1     Nov. 28, 2024

(30) Foreign Application Priority Data

May 26, 2023 (CN) .......................... 202310610900.7

(51) Int. Cl.
    *G06F 12/06*       (2006.01)
(52) U.S. Cl.
    CPC .... *G06F 12/063* (2013.01); *G06F 2212/1021* (2013.01)
(58) Field of Classification Search
    CPC .................. G06F 12/063; G06F 2212/1021
    See application file for complete search history.

(56) References Cited

U.S. PATENT DOCUMENTS

| | | | | |
|---|---|---|---|---|
| 2006/0236056 | A1* | 10/2006 | Nagata | G06F 3/061 711/165 |
| 2008/0086600 | A1* | 4/2008 | Qiao | G06F 12/0862 711/E12.057 |
| 2008/0126673 | A1* | 5/2008 | Kaneda | G06F 3/0647 711/E12.008 |

OTHER PUBLICATIONS

Dell Technologies, "Fully Automated Storage Tiering (FAST)," https://uat-prev.delltechnologies.com/en-us/glossary/fully-automated-storage-tiering.htm, Accessed Jun. 16, 2023, 1 page, 2023.
Wikipedia, "Cache Replacement Policies," https://en.wikipedia.org/wiki/Cache_replacement_policies, May 16, 2023, 12 pages.

* cited by examiner

*Primary Examiner* — Larry T Mackall
(74) *Attorney, Agent, or Firm* — Ryan, Mason & Lewis, LLP

(57) ABSTRACT

Embodiments of the present disclosure relate to a method, a device, and a computer program product for storing data. The method includes determining multiple access frequencies and multiple input/output (IO) modes of multiple data blocks, where the multiple data blocks are stored in a disk, and an IO mode in the multiple IO modes indicates an access size, a read operation proportion, and a sequential access proportion. The method further includes determining multiple cache hit ratios corresponding to the multiple IO modes. The method further includes determining multiple scores of the multiple data blocks based on the multiple access frequencies and the multiple cache hit ratios. In addition, the method further includes determining, based on the multiple scores of the multiple data blocks, a data block in the multiple data blocks to be replicated to a cache.

20 Claims, 6 Drawing Sheets

METHOD, DEVICE, AND COMPUTER PROGRAM PRODUCT FOR STORING DATA BASED ON MULTIPLE CACHE HIT RATIOS AND ASSOCIATED PREDICTION HIT RATIOS

RELATED APPLICATION

The present application claims priority to Chinese Patent Application No. 202310610900.7, filed May 26, 2023, and entitled "Method, Device, and Computer Program Product for Storing Data," which is incorporated by reference herein in its entirety.

FIELD

Embodiments of the present disclosure generally relate to the technical field of computers, and more specifically, to a method, a device, and a computer program product for storing data.

BACKGROUND

A cache in some implementations uses a flash drive as an additional storage layer within a system to temporarily store data that is frequently accessed. For data that has not yet been located on the cache, the system will replicate data blocks that are frequently accessed from their current locations on a disk to the cache. By utilizing high read and write speeds and low response time provided by the flash drive, repeated accesses to these data will benefit. Since the cache is a global resource on the system, all data can benefit from it, and the overall performance of the system will be improved.

Cache promotion is an operation of replicating data from a disk to a certain location in the cache. Since the data block is replicated due to its access mode to the cache with higher performance, this operation is marked as a promotion. When a policy engine determines that the performance of the data block will benefit from residing in the cache, the cache promotion occurs. When the policy engine monitors that the data block is frequently accessed within a certain period of time, it checks whether the data block is qualified and marks it as promoted to the cache.

SUMMARY

Embodiments of the present disclosure provide a method, an electronic device, and a computer program product for storing data.

In one aspect of the present disclosure, a method is provided. The method includes determining multiple access frequencies and multiple input/output (IO) modes of multiple data blocks, where the multiple data blocks are stored in a disk, and an IO mode in the multiple IO modes indicates an access size, a read operation proportion, and a sequential access proportion. The method further includes determining multiple cache hit ratios corresponding to the multiple IO modes. The method further includes determining multiple scores of the multiple data blocks based on the multiple access frequencies and the multiple cache hit ratios. In addition, the method further includes determining, based on the multiple scores of the multiple data blocks, a data block in the multiple data blocks to be replicated to a cache.

In another aspect of the present disclosure, an electronic device is provided. The electronic device comprises a processor, and a memory coupled to the processor, wherein the memory has instructions stored therein, and the instructions, when executed by the processor, cause the electronic device to perform actions comprising: determining multiple access frequencies and multiple IO modes of multiple data blocks, where the multiple data blocks are stored in a disk, and an IO mode in the multiple IO modes indicates an access size, a read operation proportion, and a sequential access proportion; determining multiple cache hit ratios corresponding to the multiple IO modes; determining multiple scores of the multiple data blocks based on the multiple access frequencies and the multiple cache hit ratios; and determining, based on the multiple scores of the multiple data blocks, a data block in the multiple data blocks to be replicated to a cache.

In still another aspect of the present disclosure, a computer program product is provided. The computer program product is tangibly stored on a non-transitory computer-readable medium and comprises machine-executable instructions, the machine-executable instructions, when executed by a machine, causing the machine to perform the method or process according to embodiments of the present disclosure.

This Summary is provided to introduce relevant concepts in a simplified manner, which will be further described in the Detailed Description below. The Summary is neither intended to identify key features or main features of the present disclosure, nor intended to limit the scope of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Illustrative embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless a difference is specifically indicated.

In addition, all specific numerical values herein are examples, which are provided only to aid in understanding, and are in no way intended to limit the scope.

In a data storage system, in order to improve the overall performance of the system, data blocks that are frequently accessed need to be replicated from a disk to a cache. By utilizing the high IO throughput and low response time provided by the cache, repeated access to these data will benefit. When evaluating the effect of the cache, a hit ratio of the data in the cache is often calculated, such as a read hit ratio and a write hit ratio. The higher the hit ratio, the better the effect brought by the data stored in the cache. However, when determining which data blocks need to be replicated to the cache, simply considering access frequencies of the data blocks may not be enough. Since each data block corresponds to a relatively fixed IO mode, this IO mode also affects an actual hit ratio of the data block in the cache.

Hence, embodiments of the present disclosure provide a solution for storing data blocks based on the access frequencies and the IO modes of the data blocks, so that when determining whether to replicate a data block from the disk to the cache, not only the access frequency of the data block but also the IO mode of the data block should be considered, so as to determine the data block to be replicated to the cache, optimize the performance of the cache, and improve the overall performance of the system.

Basic principles and some example implementations of the present disclosure are illustrated below with reference to FIG. 1 to FIG. 6. It should be understood that these exemplary embodiments are provided merely to enable those skilled in the art to better understand and thus implement embodiments disclosed herein, and not to limit the scope of the present disclosure in any way.

Figure 1:
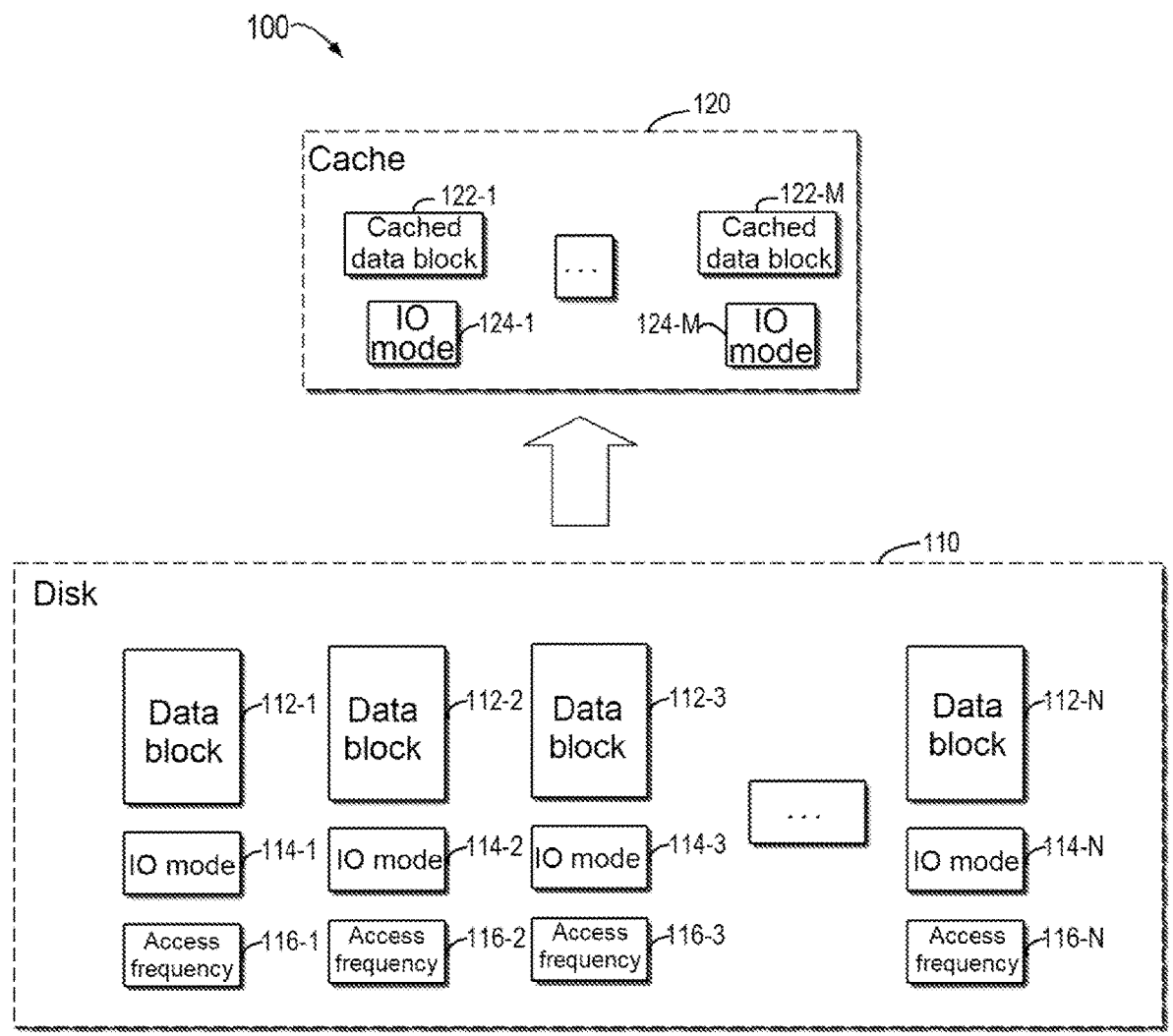
FIG. 1 shows a schematic diagram of an example environment in which embodiments of the present disclosure can be implemented.

FIG. 1 shows a schematic diagram of an example environment 100 in which an embodiment of the present disclosure can be implemented. As shown in FIG. 1, the example environment 100 includes a disk 110, data blocks 112-1 to 112-N, IO modes 114-1 to 114-N, access frequencies 116-1 to 116-N, a cache 120, cached data blocks 122-1 to 122-M, and IO modes 124-1 to 124-M. The disk 110 is used for persistent storage of data, typically consisting of one or more rotating disk plates, each with the ability to magnetically record and read data on its surface. The disk 110 includes, but is not limited to, a hard disk drive (HDD) and a solid-state drive (SSD). In the disk 110, multiple data blocks 112-1 to 112-N are stored, where N indicates a total number of data blocks on the disk 110. For each data block, when determining whether to replicate the data block to the cache 120, the determination is made based on an IO mode and an access frequency of the data block. For example, when determining whether to replicate the data block 112-1 to the cache 120, the determination is made based on the IO mode 114-1 and the access frequency 116-1. Here, the IO mode 114-1 represents a data access method of the data block 112-1. For example, the IO mode 114-1 can be "4k_70R_0S," indicating that the data block 112-1 is accessed in a 4 KB size, 70% read (R represents read), and 0% sequential access (S represents sequential access, and 0S represents 0% sequential access, i.e., completely random). For each data block, it generally has a relatively fixed IO mode. As an example, the IO mode 114-1 and the access frequency 116-1 are stored in the disk 110, but they can be stored in other locations, such as in a database, and so on.

A commonly used data block is stored in the cache 120 to reduce the number of accesses to the disk 110, which is slow but has a large capacity, and the overall performance of the system can be improved. The cached data blocks 112-1 to 122-M are "promoted" (replicated) from the disk 110, where M represents a total number of the cached data blocks in the cache. Each cached data block also has a corresponding IO mode, for example, the cached data block 122-1 corresponds to the IO mode 124-1. Before being replicated to the cache 120, the cached data block 122-1 also corresponds to the IO mode 124-1 when it is on the disk 110; that is, the data block is replicated from the disk 110 to the cache 120 without changing its IO mode. Since different IO modes correspond to different hit ratios, the IO mode 124-1 can also affect the hit ratio of the cached data block 122-1 in the cache 120. For example, the hit ratios of some IO modes in the cache 120 are listed in Table 1:

TABLE 1

Examples of Hit Ratios of IO Modes

| IO Modes | Average Read Hit Ratio (%) | Average Write Hit Ratio (%) |
| --- | --- | --- |
| 4k_70R_0 s | 47.79 | 30.64 |
| 4k_95R_0 s | 75.14 | 67.88 |
| 8k_70R_0 s | 64.97 | 43.17 |
| 64k_90R_100 s | 66.55 | 35.41 |
| 128k_70R_100 s | 83.20 | 48.67 |

For example, the average read hit ratio of the IO mode "4k_70R_0s" is 47.79%, and it is an average read hit ratio obtained by counting the read hit ratios of all cached data blocks with the IO mode "4k_70R_0s" in the cache 120 over a period of time. It can be seen from Table 1 that the average read hit ratio of the IO mode "4k_70R_0s" is 47.79%, while the average read hit ratio of "128k_70R_100s" is 83.20%. Therefore, without considering an access frequency of a data block itself, the size of its hit ratio can be determined from an IO mode.

Figure 2:
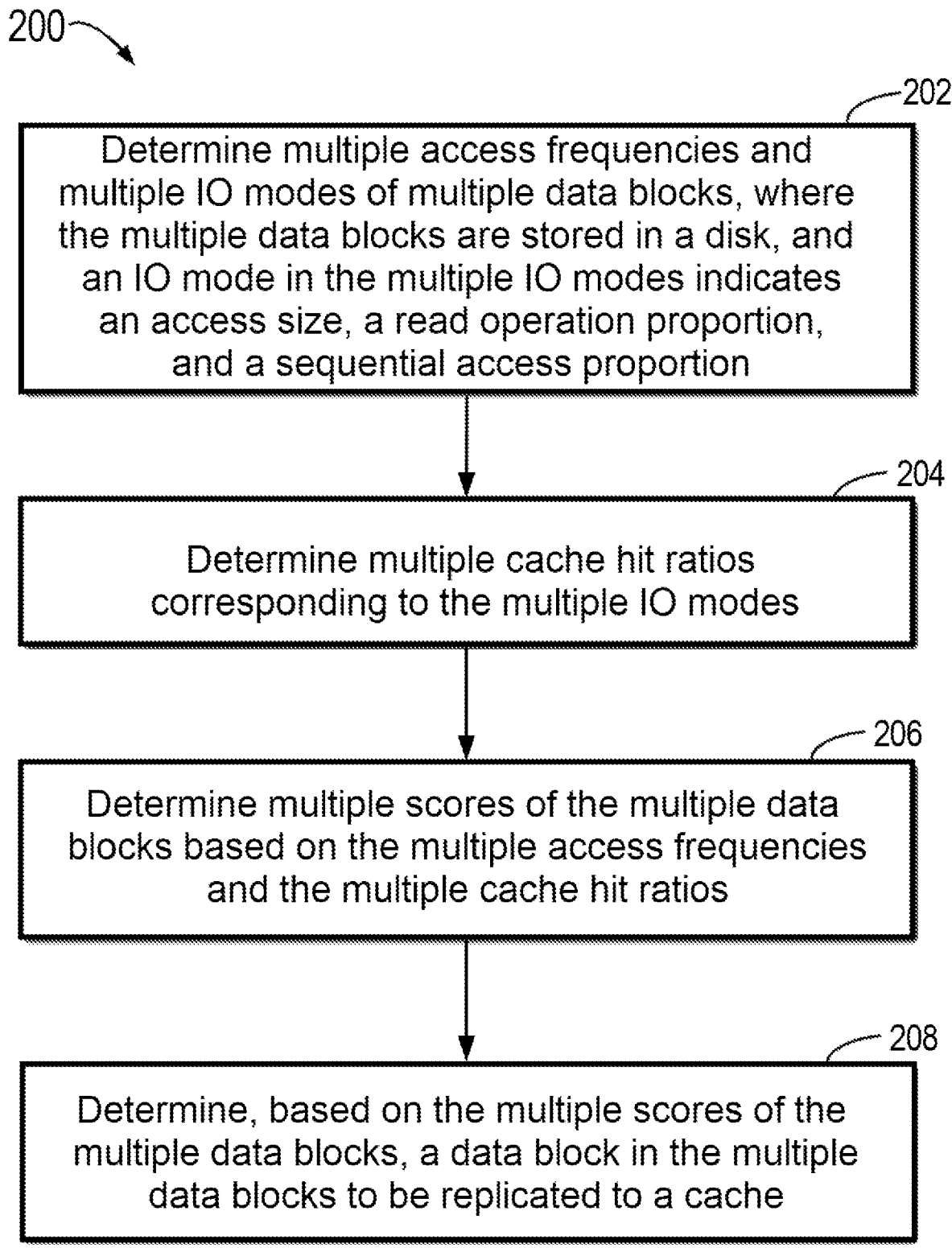
FIG. 2 shows a flow chart of a method for storing data according to some embodiments of the present disclosure.

FIG. 2 shows a flow chart of a method 200 for storing data according to some embodiments of the present disclosure. At 202, multiple access frequencies and multiple IO modes of multiple data blocks are determined, where the multiple data blocks are stored in a disk, and an IO mode in the multiple IO modes indicates an access size, a read operation proportion, and a sequential access proportion. For example, with reference to FIG. 1, IO modes 114-1 to 114-N and access frequencies 116-1 to 116-N of multiple data blocks 112-1 to 112-N are determined, these data blocks are all stored in the disk 110, and the IO modes indicate an access size, a read operation proportion, and a sequential access proportion. For example, the access frequency may indicate the number of times each data block in the multiple data blocks has been accessed over a period of time. The IO mode can be "4k_70R_0S," indicating that the data block 112-1 is accessed in a 4 KB size, 70% read (R represents read), and 0% sequential access (S represents sequential access, and 0S represents 0% sequential access, i.e., 100% random). For each data block, it generally has a relatively fixed IO mode.

At 204, multiple cache hit ratios corresponding to the multiple IO modes are determined. For example, each IO mode corresponds to a different cache hit ratio, and the cache hit ratio of an IO mode can be determined by determining the hit ratios of multiple cached data blocks corresponding to the IO mode in the cache. For example, in the cache, there are multiple cached data blocks that correspond to a certain IO mode. By calculating the hit ratios of these cached data blocks on the cache, the cache hit ratio of the IO mode can be determined.

At 206, multiple scores of the multiple data blocks are determined based on the multiple access frequencies and the multiple cache hit ratios. For example, with reference to FIG. 1, a score of the data block 112-1 is determined based on the IO mode 114-1 and an access frequency 116-1, and a score of the data block 112-2 is determined based on the IO mode 114-2 and the access frequency 116-2. By considering both the access frequency and the cache hit ratio, rather than just the access frequency, a data block can be scored in a better manner.

At 208, based on the multiple scores of the multiple data blocks, a data block in the multiple data blocks to be replicated to a cache is determined. For example, with reference to FIG. 1, if the score of the data block 112-1 is S_1, the score of the data block 112-2 is S_2, the score of the data block 112-3 is S_3, and the score of the data block 112-N is S_N, it is determined, by comparing the scores of the data blocks, whether to replicate the data block to the cache. In some embodiments, it is determined, by comparing each score of the multiple scores with a predetermined threshold, whether to replicate the data block to the cache.

Therefore, in this embodiment of the present disclosure, a score of a data block is determined from an access frequency of the data block and a cache hit ratio of its IO mode, and it is determined from the score of the data block whether to replicate the data block to the cache, so as to more accurately determine which data blocks to be replicated from the disk to the cache and improve the cache hit ratio.

Figure 3:
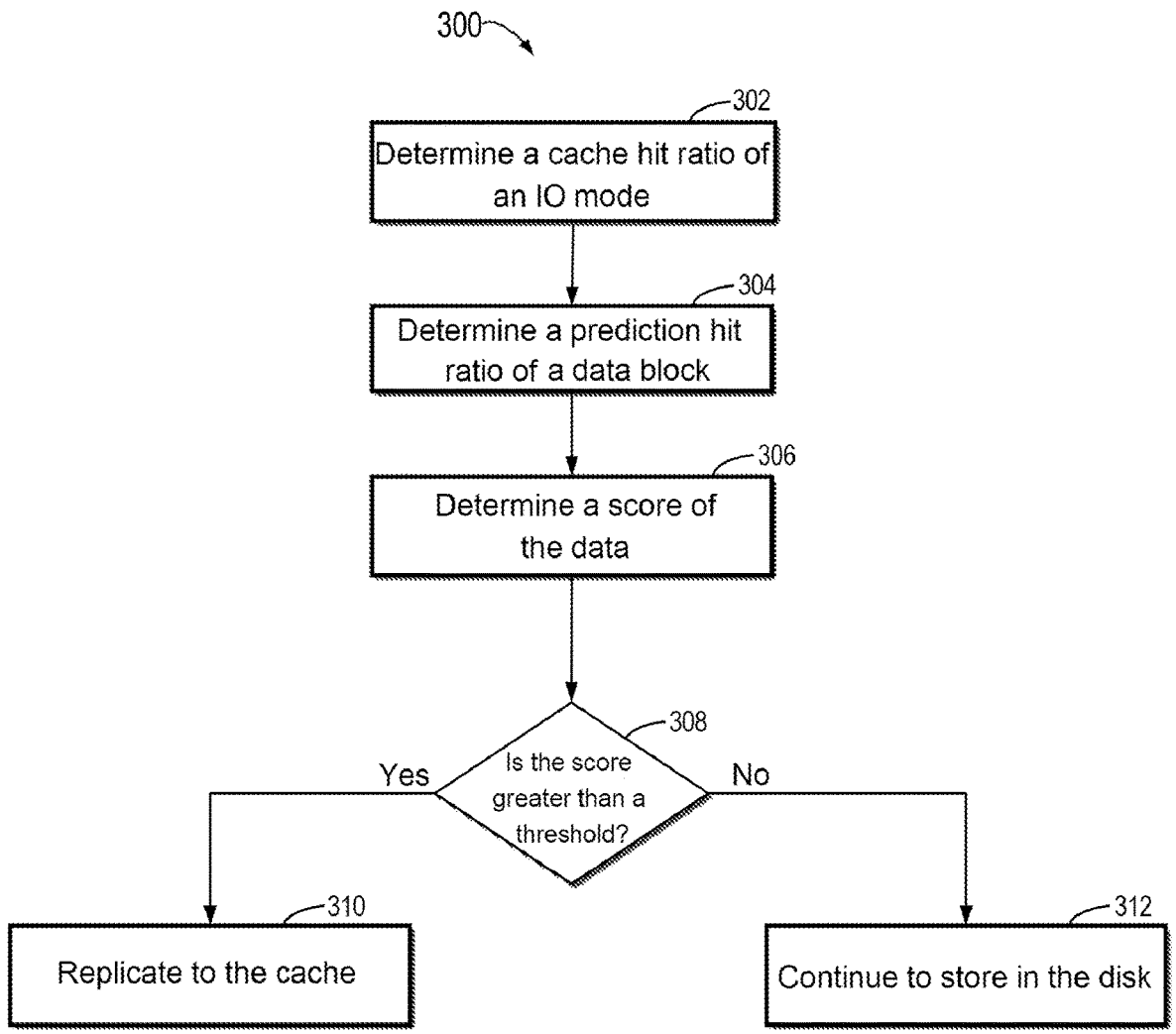
FIG. 3 shows a flow chart of another method for storing data according to some embodiments of the present disclosure.

FIG. 3 shows a flow chart of a method 300 for storing data according to some embodiments of the present disclosure. At 302, a cache hit ratio of an IO mode is determined. For example, in some embodiments, the cache hit ratio of the IO mode can be pre-calculated and stored in a database or other places for access at any time. Each data block can correspond to a specific application, and each application generally has a relatively fixed data access method. Therefore, each data block in the disk or each data block in the cache has a corresponding IO mode. The correspondence between common processing applications and IO modes is shown in Table 2:

TABLE 2

Examples of Application and IO Mode Correspondence

| Application | Access Size | Read Operation Proportion | Sequential Access Proportion |
|---|---|---|---|
| Web File Server | 4 KB/8 KB/ 64 KB | 95% | 75% |
| Web Server Log | 8 KB | 0% | 0% |
| OS Paging | 64 KB | 90% | 100% |
| Exchange Server | 4 KB | 67% | 0% R |
| Workstation | 8 KB | 80% | 80% |
| Media Stream Transmission | 64 KB | 98% | 100% |
| OLTP-Data | 8 KB | 70% | 0% R |
| OLTP-Log | 512B-64 KB | 0% | 0% R |

Figure 4:
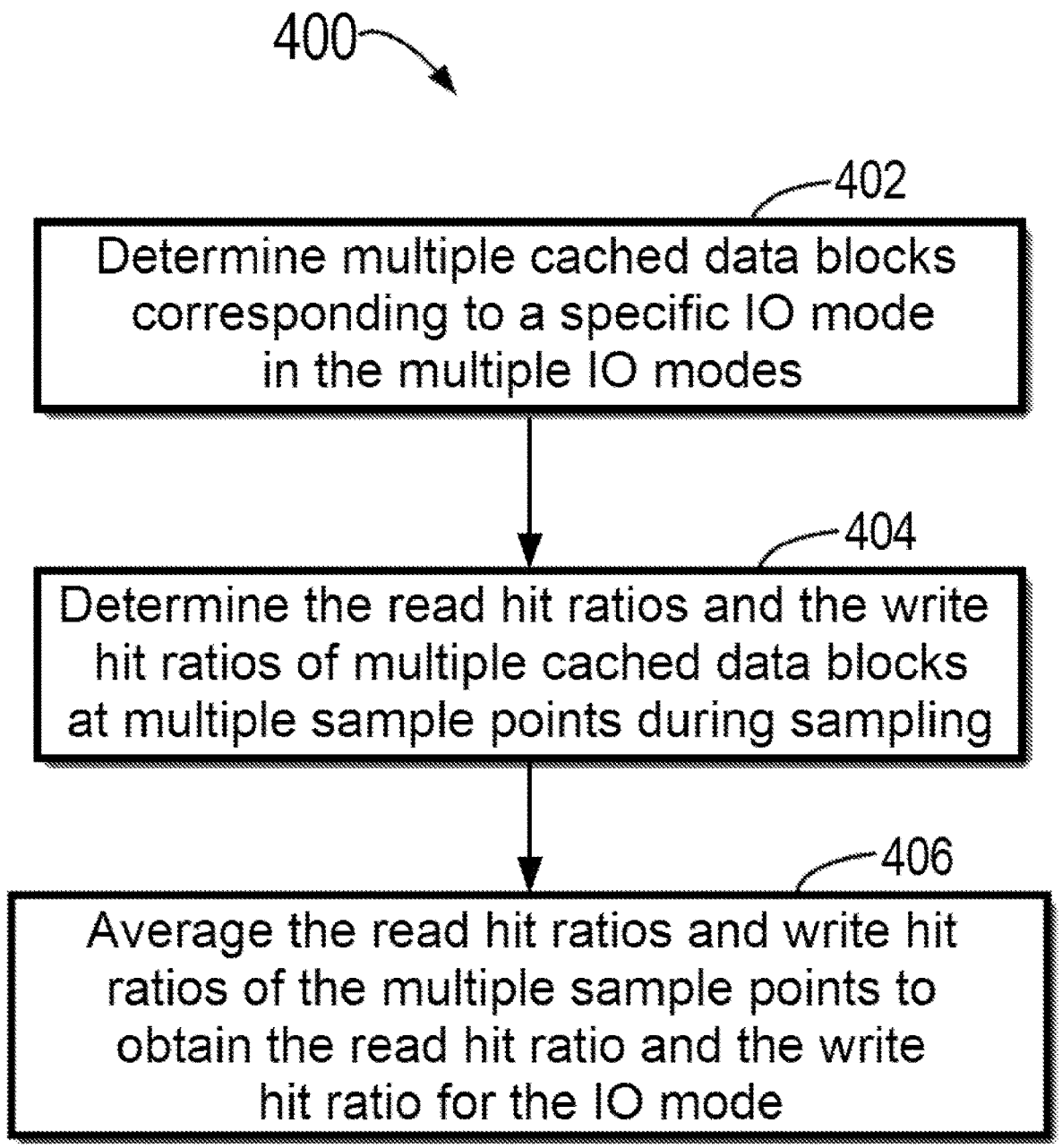
FIG. 4 shows a flow chart of a method for determining a cache hit ratio of each IO mode according to an embodiment of the present disclosure.

By calculating the hit ratios of the cached data blocks corresponding to each IO mode in the cache, the cache hit ratio of the IO mode can be determined. In some embodiments, the cache hit ratio of each IO mode includes a read hit ratio and a write hit ratio in a high-speed cache. For example, for an IO mode "4k_70R_0s," the read hit ratio is 47.79%, and the write hit ratio is 30.64%. FIG. 4 shows a flow chart of a method 400 for determining a cache hit ratio of each IO mode according to an embodiment of the present disclosure.

With reference to FIG. 4, it shows an example method for determining the cache hit ratios of each IO mode in the cache. At 402, multiple cached data blocks corresponding to a specific IO mode in the multiple IO modes are first determined. For example, for the IO mode "4k_70R_0s," which corresponds to multiple cached data blocks in the cache, the cache hit ratio of the IO mode "4k_70R_0s" can be determined by determining the cache hit ratios of the multiple cached data blocks.

At 404, the read hit ratios and the write hit ratios of multiple cached data blocks are determined at multiple sample points during sampling. In some embodiments, a length of a sampling time period is T, a sample cache hit interval is t, then it can be determined that a total number of samples is M:M=T/t, for a specific IO mode $P_k$, $1 \leq k \leq K$ where K is a total number of the IO modes, and for the specific IO mode $P_k$, at each sample point, it is determined that the read hit ratio is $H_{m,rk}$, and the write hit ratio is $H_{m,wk}$.

At 406, the read hit ratios and write hit ratios of the multiple sample points are averaged to obtain the read hit ratio and the write hit ratio for the IO mode. For example, for the specific IO mode $P_k$, its read hit ratio $H_{rk}$ can be calculated as shown in Equation (1):

$$H_{rk} = \frac{\sum_{m=1}^{M} H_{m,rk}}{M} \quad \text{Equation (1)}$$

The write hit ratio $H_{wk}$ can be calculated as shown in Equation (2):

$$H_{wk} = \frac{\sum_{m=1}^{M} H_{m,wk}}{M} \quad \text{Equation (2)}$$

Hence, a cache hit ratio of each IO mode in the multiple IO modes can be determined.

Returning to FIG. 3, at 304, a prediction hit ratio of the data block is determined. Since the data block has not been replicated to the cache, the hit ratio of the data block in the cache cannot be directly calculated. However, the prediction hit ratio of the data block in the cache can be determined from the cache hit ratio of the IO mode of the data block. For example, for multiple IO modes, an average read hit ratio $avgH_r$ of all the IO modes is obtained as shown in Equation (3):

$$avgH_r = \frac{\sum_{k=1}^{K} H_{rk}}{K} \quad \text{Equation (3)}$$

The average write hit ratio $avgH_w$ is determined in accordance with Equation (4):

$$avgH_w = \frac{\sum_{k=1}^{K} H_{wk}}{K} \qquad \text{Equation (4)}$$

Hence, a difference value between each IO mode and the average value can be obtained; for example, the difference value $deltaH_{rk}$ between the read hit ratio $H_{rk}$ of the specific IO mode $P_k$ and the average read hit ratio $avgH_r$ is determined as shown in Equation (5):

$$deltaH_{rk} = H_{rk} - avgH_r \qquad \text{Equation (5)}$$

The difference value $deltaH_{wk}$ between the write hit ratio $H_{wk}$ of the specific IO mode $P_k$ and the average write hit ratio $avgH_w$ is determined as shown in Equation (6):

$$deltaH_{wk} = H_{wk} - avgH_w \qquad \text{Equation (6)}$$

Suppose there are $N_h$ data blocks in total in a disk, where $1 \leq i \leq N_h$, for the data block $C_{hi}$, there is an IO mode $P_k$, and then the prediction hit ratio $H_{ik}$ of the data block $C_{hi}$ can be calculated through Equation (7):

$$H_{ik} = w_w * deltaH_{wk} + w_r * deltaH_{rk} \qquad \text{Equation (7)}$$
$$= w_w * (H_{wk} - avgH_w) + w_r * (H_{rk} - avgH_r)$$

where $w_w$ indicates a read hit ratio weight, $w_r$ indicates a write hit ratio weight, and the sum of them is 1; when $w_w$ is 0.5 and $w_r$ is 0.5, it indicates that when the predicted hit ratio of a data block is calculated, the read hit ratio and the write hit ratio of the IO mode have the same weight.

At 306, the score of the data block is determined. In some embodiments, for each data block $C_{hi}$, the access frequency of the data block over a period is $f_{hi}$, then the score $S_{hi}$ of the data block $C_{hi}$ is computed as shown in Equation (8):

$$S_{hi} = f_{hi} * (1 + H_{ik}) = f_{hi} * (1 + w_w * deltaH_{wk} + w_r * deltaH_{rk}) \qquad \text{Equation (8)}$$

Hence, it can be seen that if the access frequency and the prediction hit ratio of a data block are high, a relatively high score can be obtained.

At 308, the score is compared with a predetermined threshold; if the score is greater than the predetermined threshold, the process moves to 310, and the data block is replicated to the cache; otherwise, the process moves to 312, and the data block will continue to be stored in the disk and will not be replicated to the cache. In some embodiments, the predetermined threshold can be determined by historical scores of all data blocks. In other embodiments, it can be determined only by current scores of all data blocks.

Hence, when determining whether to replicate a specific data block from multiple data blocks in a disk to a cache, taking into account both an access frequency and an IO mode of the data block, and determining a prediction hit ratio of the data block in the cache from the IO mode can better determine whether the data block should be replicated to the cache, so as to improve the effect of the cache and the overall storage performance.

Figure 5:
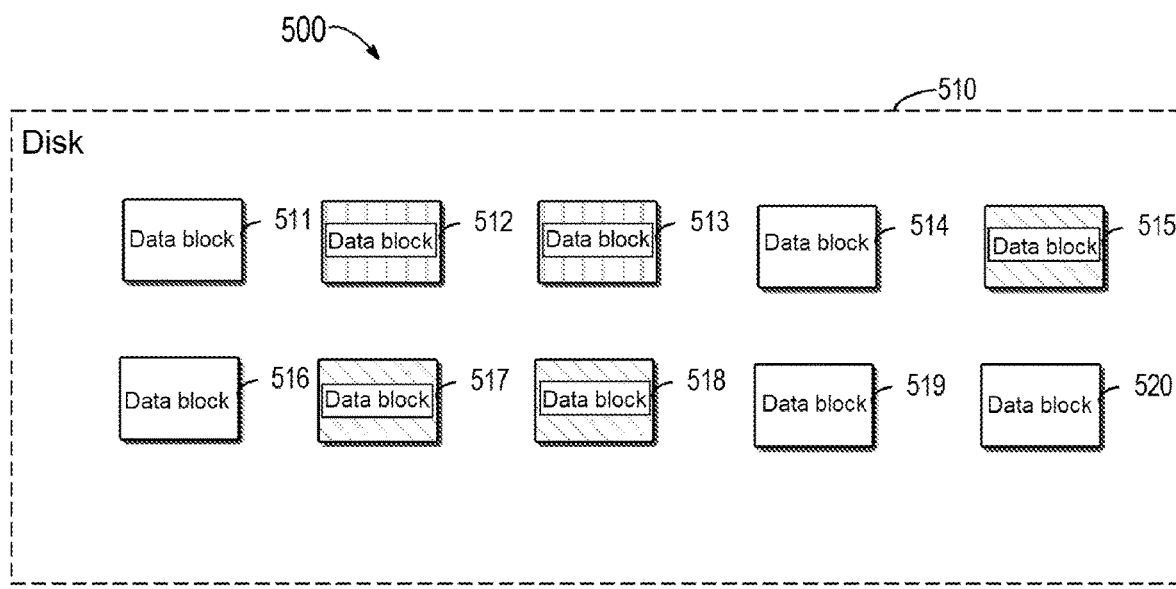
FIG. 5 shows a comparison diagram of a duplication result of a data block according to an embodiment of the present disclosure.

FIG. 5 shows a comparison diagram of a duplication result 500 of a data block according to an embodiment of the present disclosure. As shown in FIG. 5, a disk 510 includes data blocks 511 to 520, i.e., 10 data blocks in total, where an access frequency and an IO mode of each data block are shown in Table 3:

TABLE 3

Examples of Access Frequencies and IO Modes of Data Blocks

| Data block | Access Frequency | IO Mode |
|---|---|---|
| Data block 511 | 3 | $P_1$ |
| Data block 512 | 3 | $P_2$ |
| Data block 513 | 3 | $P_2$ |
| Data block 514 | 3 | $P_3$ |
| Data block 515 | 5 | $P_4$ |
| Data block 516 | 2 | $P_5$ |
| Data block 517 | 4 | $P_1$ |
| Data block 518 | 5 | $P_2$ |
| Data block 519 | 2 | $P_3$ |
| Data block 520 | 1 | $P_4$ |

A read hit ratio and a write hit ratio of each IO mode are shown in Table 4:

TABLE 4

Examples of Hit Ratios of IO Modes

| IO Mode | Read Hit Ratio (%) | Write Hit Ratio (%) |
|---|---|---|
| $P_1$ | 47.79 | 30.64 |
| $P_2$ | 75.14 | 67.88 |
| $P_3$ | 64.97 | 43.17 |
| $P_4$ | 66.55 | 35.41 |
| $P_5$ | 83.20 | 48.67 |

The score of each data block in the multiple data blocks is calculated as shown in Table 5:

TABLE 5

Examples of Scores Calculated for Data Blocks

| Data block | Access Frequency | IO Mode | Prediction Hit Ratio | Score |
|---|---|---|---|---|
| Data block 511 | 3 | $P_1$ | −0.173 | 2.481 |
| Data block 512 | 3 | $P_5$ | 0.097 | 3.291 |
| Data block 513 | 3 | $P_2$ | 0.152 | 3.456 |
| Data block 514 | 3 | $P_3$ | −0.023 | 2.931 |
| Data block 515 | 5 | $P_4$ | −0.053 | 4.735 |
| Data block 516 | 2 | $P_5$ | 0.097 | 2.194 |
| Data block 517 | 4 | $P_1$ | −0.173 | 3.308 |
| Data block 518 | 5 | $P_2$ | 0.152 | 5.76 |
| Data block 519 | 2 | $P_3$ | −0.023 | 1.894 |
| Data block 520 | 1 | $P_4$ | −0.053 | 0.947 |

Based on Table 5, it can be seen that when the predetermined threshold is 3, when only the access frequency of a data block is considered, data blocks 515, 517, and 518 should be replicated to the cache, because the access frequencies of these three data blocks are greater than 3. When the access frequency and the IO mode are both considered, besides the data blocks 515, 517, and 518, data blocks 512 and 513 will also be replicated to the cache, because the scores of the data blocks are all greater than 3. Hence, when determining whether to replicate a specific data block from multiple data blocks in a disk to a cache, taking into account both an access frequency and an IO mode of the data block, and determining a prediction hit ratio of the data block in the cache from the IO mode can better determine whether the data block should be replicated to the cache, so as to improve the effect of the cache and the overall storage performance.

Figure 6:
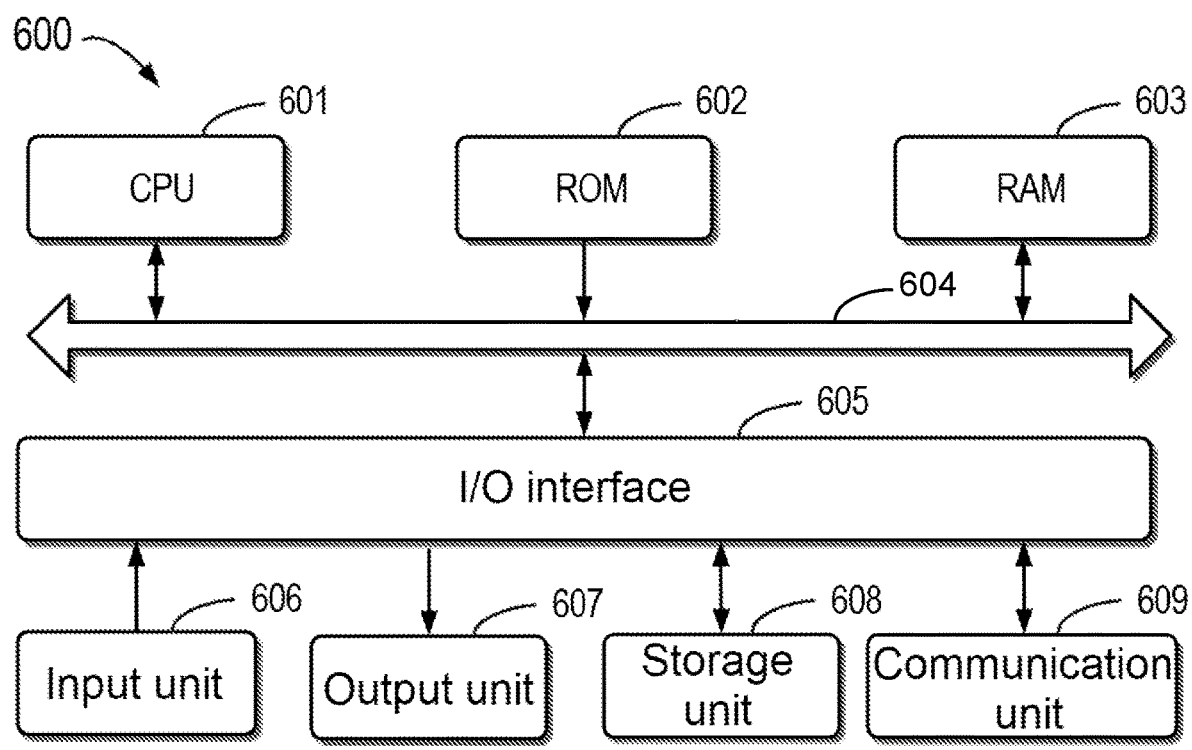
FIG. 6 shows a block diagram of a device that can be used for implementing embodiments of the present disclosure.

FIG. 6 shows a block diagram of a device 600 that may be used to implement embodiments of the present disclosure. The device 600 may be a device or an apparatus as described in embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604. Although not shown in FIG. 6, the device 600 may also include a co-processor.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various methods or processes described above may be performed by the CPU 601. For example, in some embodiments, one or more of the methods or processes can be implemented as a computer software program that is tangibly included in a machine-readable medium such as the storage unit 608. In some embodiments, part of or all the computer program may be loaded and/or installed onto the device 600 via the ROM 602 and/or the communication unit 609. When the computer program is loaded into the RAM 603 and executed by the CPU 601, one or more steps or actions of the method or process described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for storing data, comprising:
   determining multiple access frequencies and multiple input/output (IO) modes of multiple data blocks, wherein the multiple data blocks are stored in at least one storage drive of a storage system, and an IO mode in the multiple IO modes indicates at least one of an access size, a read operation proportion, and a sequential access proportion;
   determining multiple cache hit ratios corresponding to the multiple IO modes, with reference to a cache of the storage system, the multiple cache hit ratios including for each of one or more of the multiple IO modes at least one read hit ratio and at least one write hit ratio;
   determining multiple scores of the multiple data blocks based on the multiple access frequencies and further based on one or more prediction hit ratios computed at least in part from the multiple cache hit ratios; and
   determining, based on the multiple scores of the multiple data blocks, a data block in the multiple data blocks to be replicated to the cache.

2. The method according to claim 1, wherein the multiple cache hit ratios comprise multiple read hit ratios and multiple write hit ratios, and determining the multiple cache hit ratios corresponding to the multiple IO modes comprises:
   determining the multiple read hit ratios and the multiple write hit ratios corresponding to the multiple IO modes.

3. The method according to claim 2, wherein determining the multiple scores of the multiple data blocks comprises:
   determining multiple prediction hit ratios of the multiple data blocks on the cache based on the multiple read hit ratios and the multiple write hit ratios; and
   determining the multiple scores of the multiple data blocks based on the multiple access frequencies and the multiple prediction hit ratios.

4. The method according to claim 3, wherein determining the multiple prediction hit ratios of the multiple data blocks on the cache comprises:
   determining the multiple prediction hit ratios based on determining a difference value of the multiple read hit ratios and a difference value of the multiple write hit ratios that are corresponding to the multiple IO modes and based on a read hit ratio weight and a write hit ratio weight.

5. The method according to claim 4, wherein determining the difference value of the multiple read hit ratios and the difference value of the multiple write hit ratios comprises:
   determining an average read hit ratio and an average write hit ratio based on the multiple read hit ratios and the multiple write hit ratios;
   determining a difference value of the multiple read hit ratios based on a difference between each read hit ratio in the multiple read hit ratios and the average read hit ratio; and
   determining a difference value of the multiple write hit ratios based on a difference between each write hit ratio in the multiple write hit ratios and the average write hit ratio.

6. The method according to claim 2, wherein determining the multiple read hit ratios and the multiple write hit ratios corresponding to the multiple IO modes comprises:
   for each IO mode in the multiple IO modes, determining each read hit ratio in the multiple read hit ratios based on read hit ratios at multiple sample points; and
   for each IO mode in the multiple IO modes, determining each write hit ratio in the multiple write hit ratios based on write hit ratios at multiple sample points.

7. The method according to claim 6, wherein:
   determining each read hit ratio in the multiple write hit ratios comprises: determining an average value of the read hit ratios at the multiple sample points; and
   determining each write hit ratio in the multiple write hit ratios comprises: determining an average value of the write hit ratios at the multiple sample points.

8. The method according to claim 1, wherein determining the data block in the multiple data blocks to be replicated to the cache comprises:
   determining the data block to be replicated to the cache based on comparing a score of each data block in the multiple data blocks with a predetermined threshold.

9. The method according to claim 8, further comprising:
   for each data block in the multiple data blocks:
     in response to the score of the data block being greater than the predetermined threshold, replicating the data block to the cache; and
     in response to the score of the data block being less than the predetermined threshold, retaining the data block in the at least one storage drive.

10. The method according to claim 9, wherein the predetermined threshold is determined based on historical scores of the multiple data blocks.

11. An electronic device, comprising:
    at least one processor; and
    memory coupled to the at least one processor, wherein the memory has instructions stored therein, and the instructions, when executed by the at least one processor, cause the electronic device to perform actions comprising:
   determining multiple access frequencies and multiple input/output (IO) modes of multiple data blocks, wherein the multiple data blocks are stored in at least one storage drive of a storage system, and an IO mode in the multiple IO modes indicates at least one of an access size, a read operation proportion, and a sequential access proportion;
   determining multiple cache hit ratios corresponding to the multiple IO modes, with reference to a cache of the storage system, the multiple cache hit ratios including for each of one or more of the multiple IO modes at least one read hit ratio and at least one write hit ratio;
   determining multiple scores of the multiple data blocks based on the multiple access frequencies and further based on one or more prediction hit ratios computed at least in part from the multiple cache hit ratios; and
   determining, based on the multiple scores of the multiple data blocks, a data block in the multiple data blocks to be replicated to the cache.

12. The electronic device according to claim 11, wherein the multiple cache hit ratios comprise multiple read hit ratios and multiple write hit ratios, and determining the multiple cache hit ratios corresponding to the multiple IO modes comprises:
   determining the multiple read hit ratios and the multiple write hit ratios corresponding to the multiple IO modes.

13. The electronic device according to claim 12, wherein determining the multiple scores of the multiple data blocks comprises:
   determining multiple prediction hit ratios of the multiple data blocks on the cache based on the multiple read hit ratios and the multiple write hit ratios; and
   determining the multiple scores of the multiple data blocks based on the multiple access frequencies and the multiple prediction hit ratios.

14. The electronic device according to claim 13, wherein determining the multiple prediction hit ratios of the multiple data blocks on the cache comprises:
   determining the multiple prediction hit ratios based on determining a difference value of the multiple read hit ratios and a difference value of the multiple write hit ratios that are corresponding to the multiple IO modes and based on a read hit ratio weight and a write hit ratio weight.

15. The electronic device according to claim 14, wherein determining the difference value of the multiple read hit ratios and the difference value of the multiple write hit ratios comprises:
   determining an average read hit ratio and an average write hit ratio based on the multiple read hit ratios and the multiple write hit ratios;
   determining a difference value of the multiple read hit ratios based on a difference between each read hit ratio in the multiple read hit ratios and the average read hit ratio; and
   determining a difference value of the multiple write hit ratios based on a difference between each write hit ratio in the multiple write hit ratios and the average write hit ratio.

16. The electronic device according to claim 12, wherein determining the multiple read hit ratios and the multiple write hit ratios corresponding to the multiple IO modes comprises:
   for each IO mode in the multiple IO modes, determining each read hit ratio in the multiple read hit ratios based on read hit ratios at multiple sample points; and
   for each IO mode in the multiple IO modes, determining each write hit ratio in the multiple write hit ratios based on write hit ratios at multiple sample points.

17. The electronic device according to claim 16, wherein:
   determining each read hit ratio in the multiple write hit ratios comprises: determining an average value of the read hit ratios at the multiple sample points; and
   determining each write hit ratio in the multiple write hit ratios comprises: determining an average value of the write hit ratios at the multiple sample points.

18. The electronic device according to claim 11, wherein determining the data block in the multiple data blocks to be replicated to the cache comprises:
   determining the data block to be replicated to the cache based on comparing a score of each data block in the multiple data blocks with a predetermined threshold.

19. The electronic device according to claim 18, wherein the actions further comprise:
   for each data block in the multiple data blocks:
      in response to the score of the data block being greater than the predetermined threshold, replicating the data block to the cache; and
      in response to the score of the data block being less than the predetermined threshold, retaining the data block in the at least one storage drive.

20. A computer program product comprising a non-transitory computer-readable medium that stores machine-executable instructions, wherein the machine-executable instructions, when executed by a machine, cause the machine to perform actions comprising:
   determining multiple access frequencies and multiple input/output (IO) modes of multiple data blocks, wherein the multiple data blocks are stored in at least one storage drive of a storage system, and an IO mode in the multiple IO modes indicates at least one of an access size, a read operation proportion, and a sequential access proportion;
   determining multiple cache hit ratios corresponding to the multiple IO modes, with reference to a cache of the storage system, the multiple cache hit ratios including for each of one or more of the multiple IO modes at least one read hit ratio and at least one write hit ratio;
   determining multiple scores of the multiple data blocks based on the multiple access frequencies and further based on one or more prediction hit ratios computed at least in part from the multiple cache hit ratios; and
   determining, based on the multiple scores of the multiple data blocks, a data block in the multiple data blocks to be replicated to the cache.

* * * * *